United States Patent [19]

Takemoto et al.

[11] Patent Number: 4,621,291

[45] Date of Patent: Nov. 4, 1986

[54] SOLID-STATE IMAGING DEVICE

[75] Inventors: Iwao Takemoto, Tokyo; Shinya Ohba, Kanagawa; Masakazu Aoki, Kodaira; Haruhisa Ando, Hachioji; Masaaki Nakai, Kodaira; Toshifumi Ozaki, Tokyo; Takuya Imaide, Yokohama, all of Japan

[73] Assignee: Hitachi, Ltd., Tokyo, Japan

[21] Appl. No.: 462,763

[22] Filed: Feb. 1, 1983

[30] Foreign Application Priority Data

Mar. 3, 1982 [JP] Japan .................................. 57-32468

[51] Int. Cl.$^4$ ............................................. H04N 3/14
[52] U.S. Cl. .................................................. 358/213
[58] Field of Search ....................... 358/213, 212, 167; 357/24 LR; 250/578

[56] References Cited

U.S. PATENT DOCUMENTS

| 4,242,599 | 12/1980 | Suzuki | 358/213 |
| 4,349,743 | 9/1982 | Ohba et al. | 250/578 |
| 4,450,484 | 5/1984 | Terakawa | 358/213 |

FOREIGN PATENT DOCUMENTS 57-41081  3/1982  Japan .................................. 358/213

Primary Examiner—Gene Z. Rubinson
Assistant Examiner—Stephen Brinich
Attorney, Agent, or Firm—Antonelli, Terry & Wands

[57] ABSTRACT

This invention relates to an area imaging device having an array of picture elements formed of photodiodes and insulated-gate MOSTs which is vertically scanned by a shift register and horizontally scanned by a charge transfer device (CTD). The solid-state imaging device according to this invention has a transfer MOST provided between a vertical signal output line and a horizontal switch MOST, a resetting MOST connected to the junction between said transfer MOST and the horizontal switch MOST, and a mechanism for setting the vertical signal line at a reference potential just before signal transfer. The transfer MOST connected between the junction of the horizontal switch MOST and the resetting MOST and the vertical signal line is a double-gate MOST formed of a series connection of a transfer gate and another transfer gate. Therefore, the charges under the gate of the transfer MOST can be removed for fixed noise to be greatly reduced.

2 Claims, 10 Drawing Figures

SOLID-STATE IMAGING DEVICE

BACKGROUND OF THE INVENTION

This invention relates to an area solid-state imaging device of the type in which an array of picture elements of photodiodes and insulated gate field effect transistors (hereinafter, referred to as MOST) is vertically scanned by a shift register and horizontally scanned by a charge transfer device (hereinafter, referred to as CTD).

Two types of the solid-state imaging devices are known: the MOS type using insulated gate field-effect transistors and the CTD type using charge transfer devices. The former, or the MOST type makes effective use of light of the image and produces a large amount of signal charge. On the other hand, the MOST type generates a higher noise during reading than the CTD type. Thus, both types have an advantage and a disadvantage.

Figure 1:
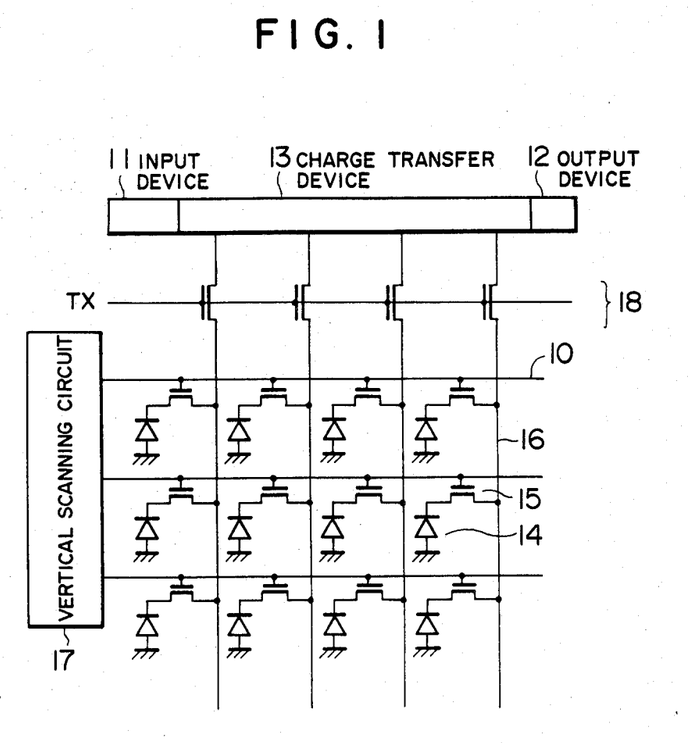
FIGS. 1, 2 and 3 are explanatory diagrams useful for explaining conventional solid-state imaging devices.

A solid state imaging device with the advantages of these two types has been proposed in which its light-sensitive portion is of the MOS type and its read register is of the CTD type, as shown in FIG. 1.

FIG. 1 schematically shows one example of a conventional solid-state imaging device having a photodiode array for the light-sensitive portion and a read register CTD. Referring to FIG. 1, there are shown an input device 11 of CTD, an output device 12 thereof, a charge transfer device 13 thereof, photodiodes 14, vertical switch MOSTs 15, vertical signal lines 16, a vertical scanning circuit 17 and transfer gates 18.

In operation of FIG. 1, signal charges on the vertical signal lines 16 are transferred to the CTD during the horizontal blanking period. When the potential of a certain vertical gate line 10 is high in the horizontal blanking period, the signal charges of the photodiodes in a row are transferred to the vertical signal lines 16. Then, when the shift pulse at the transfer gates 18 (TX) and CTD 13 becomes high level, the signal charges on the vertical signal lines 16 flow toward the CTD 13. At the last time of transferring, the vertical signal lines 16 are clamped at a potential $V_c$ as defined by $$V_c = V_T - V_{th}(TX) \quad (1)$$

where $V_T$ represents the high-level voltage at the transfer gates TX, and $V_{th}(TX)$ is the effective threshold voltage including the substrate biasing effect, at the transfer gates TX.

This example of the conventional imaging device of the compromise type between the MOS type and CTD type was expected to have excellent performance, but actually achieved only quite satisfactory performance for the following reasons.

When the charges on the vertical signal lines are transferred to the CTD, random noise (thermal noise) as expressed by Eq. (2) is caused by the fluctuation of the high-level voltage at the transfer gate which determines the clamp potential on the vertical signal lines:

$$<q^2> = \tfrac{1}{2} S_u(O) C_v^2 / t \quad (2)$$

where $S_u(O)$ is the power spectrum of the fluctuation of clock, $C_v$ the electrostatic capacitance of the vertical signal line and t the transfer time.

For example, in the common pulse drive method, the noise current is about 2.2 nA under $\sqrt{S_u(O)} = 0.7$ $\mu V/\sqrt{Hz}$ (S/N = 100 dB at 15 kHz and 10-V amplitude). $C_v = 1.6$ pF and $t = 2$ $\mu$sec.

In order to reduce this noise, it is necessary to decrease the fluctuation of the voltage at transfer gates upon switching on, which determines the clamp potential on the vertical signal lines.

Figure 2:
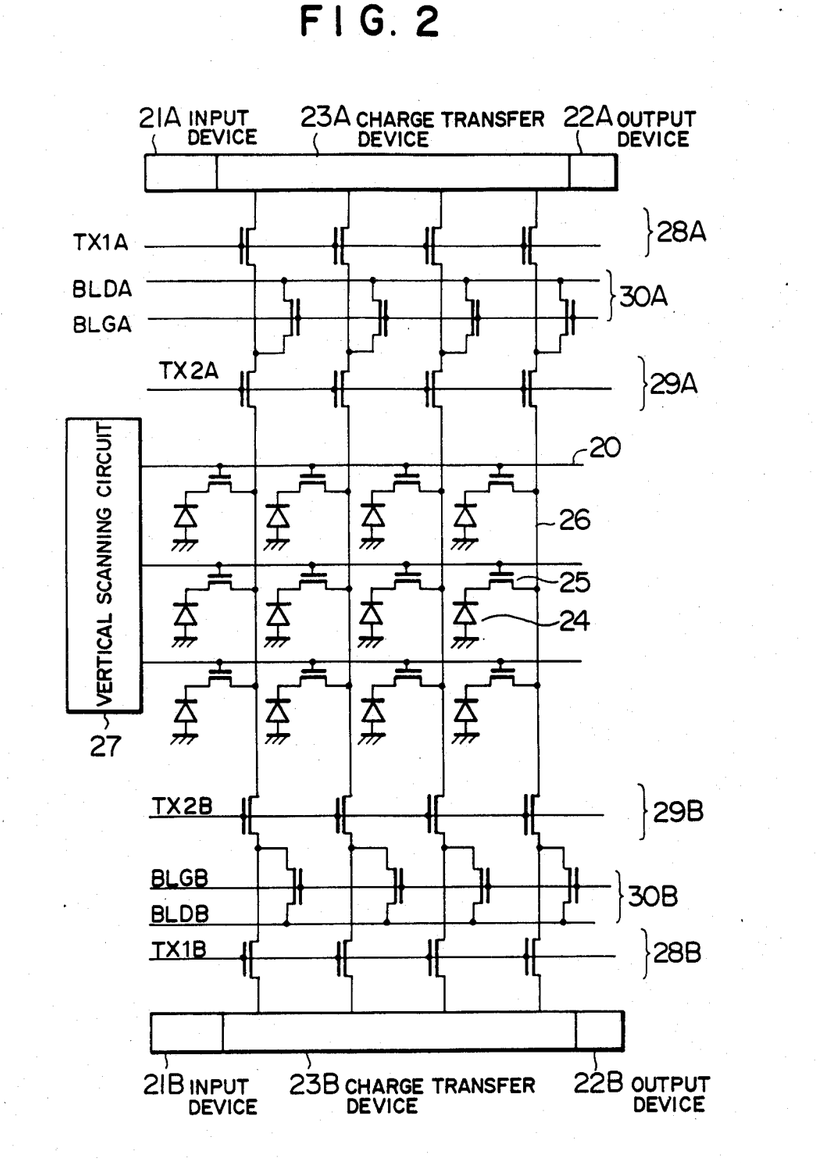
Figure 3:
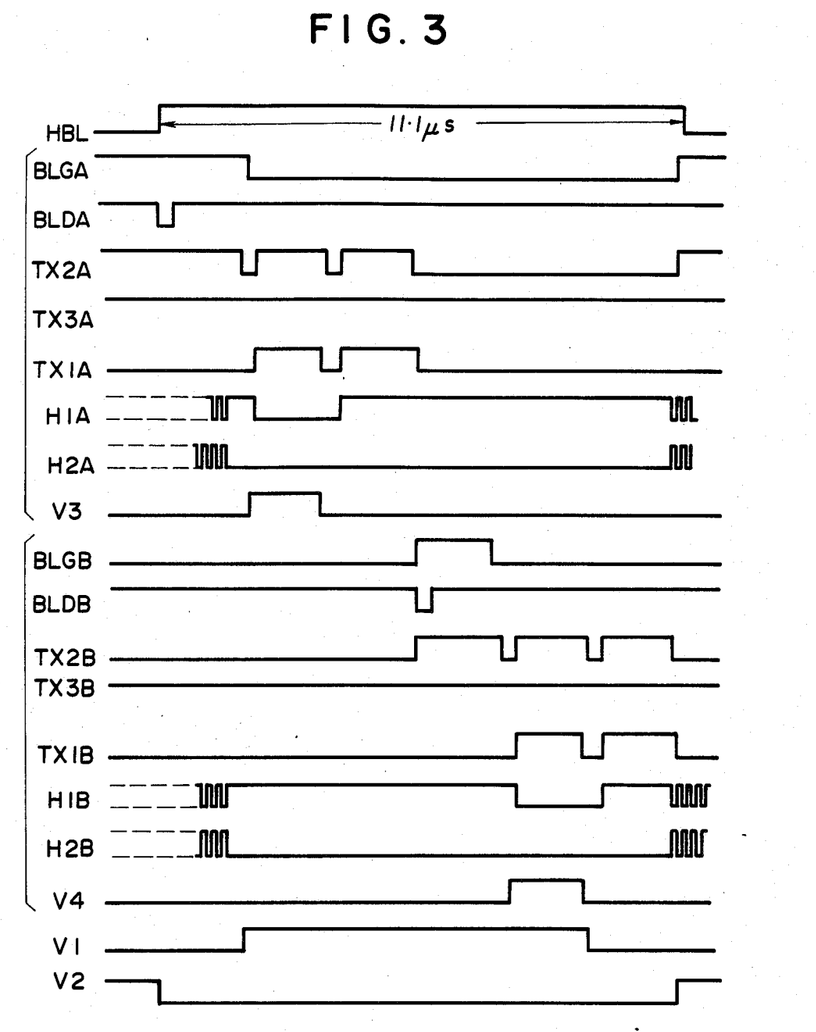

In the Japanese utility model application laid-open No. 78364/1981 (laid-open on June 25, 1981) there is disclosed another example of the solid-state imaging device using a photodiode array for the light sensitive portion and a CTD for the read register. This device has a blooming preventing circuit as shown in FIG. 2. Referring to FIG. 2, there are shown input devices 21A and 21B of the CTD, output devices 22A and 22B thereof, charge transfer devices 23A and 23B thereof, photodiodes 24, vertical switch MOSTSs 25, vertical signal lines 26, a vertical scanning circuit 27, first transfer gates 28A and 28B, second transfer gates 29A and 29B and blooming preventing circuits 30A and 30B. The operation of this imaging device will hereinafter be described. FIG. 3 is a timing chart of the pulses in the solid-state imaging device of FIG. 2.

The CTD operates in the horizontal scanning period to transfer each signal to the output stage, and at the same time constant bias charges are transferred in turn from the input device. At the end of the horizontal scanning period, all the signals have been read and a constant amount of charge CG exists at each stage of the CTD.

At the start of the horizontal blanking period, A-channel operation begins. When the pulse TX2 and BLG in FIG. 2 become high level and the pulse BLD therein is at low level, the charges from the BLD line flow into the vertical signal line. Then, when the BLD is made high level, the charges conversely flow from the vertical signal line to the BLD line, and the vertical signal line is clamped at a potential $V_{vc}$ expressed by the following equation to stop the current flow:

$$V_{vc} = V_{TX2} - V_{thTX2} \quad (3)$$

wherein $V_{TX2}$ and $V_{thTX2}$ represent the high-level voltage on the TX2 and the effective threshold voltage at the TX2 gate 29, including substrate biasing effect, respectively.

The BLG becomes low level, and the BLG and BLD do not participate in the following operations. Then, the TX1 becomes high level, and when the shift pulse H1 to the CTD is made low level, each bias charge CG sent from the input device of the CTD is transferred to the respective vertical signal lines. When the H1 is low level, the charge must be prevented from shifting to the adjacent electrode to the CTD by properly setting up the potential relation. Specifically, if the threshold voltage of the CTD channel, the threshold voltage of the transfer gate TX1, the low level of the shift pulse H2 to the CTD and the high level of the transfer pulse TX1 are represented by $V_{thC}$, $V_{thTX1}$, $H_{2L}$ and $V_{TX1}$, respectively, it is necessary to satisfy the condition given by $$V_{TX1} - V_{thTX1} \geq H_{2L} - V_{thc} \quad (4)$$

At this time, when the potential $V_{20}$ on a vertical gate line (at 20 in FIG. 2) becomes high level, the signal charges in the photodiodes on a row are transferred to the vertical signal lines to mix with the bias charges from the CTD.

When the shift pulse H1 to the CTD is at high level, the bias charge and signal charge on the vertical signal line flow to the CTD until the vertical signal line reaches the potential $V_{vc}$ expressed by Eq. (3).

When the transfer pulse TX1 is made low level, the vertical signal line is electrically disconnected from the CTD, and at this time the bias charge at the CTD is added with the signal charge from the photodiode.

Although signals on the nth row are fed to the A-channel CTD as described above, signals on the (n+1)th row are transferred to the other B-channel CTD in the second half of the horizontal blanking period as in the A-channel. Thus, the CTDs of A- and B-channels are operated in the horizontal period, so that signals on two rows are read in turn from the two output stages. This type of solid-state imaging device can thus read two rows at a time. Of course, provision of only A-channel will result in the solid-state imaging device of one-row reading type.

In this conventional imaging device, if the respective vertical signal lines are set at the clamp potential as in Eq. (3) at each channel by the BLD and BLG before the signals are read, it will be expected to remove the adverse effects of the threshold voltage fluctuation at the second transfer gates of A- and B-channels over 10 mV to 100 mV and the threshold voltage fluctuation on the vertical signal lines. In addition, an excellent characteristic will be expected from the combination of the advantages of the MOS and CTD types. In practice, however, random noise is caused by the pulse drive of the second transfer gate and thus no satisfactory characteristics can be obtained as in the example of FIG. 1.

SUMMARY OF THE INVENTION

An object of this invention is to obviate such defects.

Accordingly, in this invention there is provided a solid-state imaging device having a transfer MOST provided between a vertical signal output line and a horizontal switch MOST, a resetting MOST connected at the junction between said transfer MOST and said horizontal switch MOST and a mechanism for setting the vertical signal line at a reference potential just before signal transfer, wherein said transfer MOST connected between the junction between horizontal switch MOST and said resetting MOST and said vertical signal line is a double-gate MOST having a series of a transfer gate and another transfer gate.

DESCRIPTION OF THE PREFERRED EMBODIMENTS

In order to solve the problem in the prior art, the assignee in this application has filed Japanese Patent applications on a solid-state imaging device which is so arranged that clamp gates for determining a clamp level at vertical signal lines are connected in series to transfer gates between a CTD for reading signals and the vertical signal lines and the clamp gates and the transfer gates are driven by a DC source and a pulse, respectively so that operating MOSTs on the DC source determine the clamp level at the vertical signal lines. The applications are Japanese Utility Model Application No. 53744/1981 (corresponding to Japanese Utility Model Application Laid-Open No. 168371/82, laid-open on Oct. 23, 1982) and Japanese Utility Model Application No. 74584/1981 (corresponding to Japanese Utility Model Application Laid-Open No. 188473/82, laid-open on Nov. 30, 1982).

Figure 4:
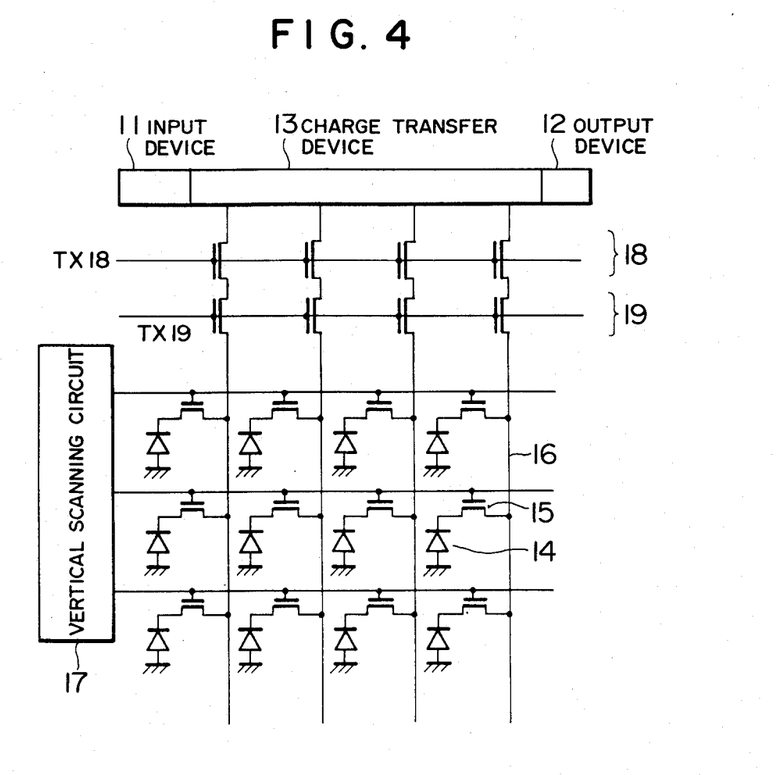
FIGS. 4, 5 and 6A, 6B are diagrams of solid-state imaging devices disclosed in prior applications filed by the assignee of the this application and not published yet.

FIG. 4 is a schematical circuit diagram thereof, in which like elements corresponding to those in FIG. 1 are identified by the same reference numerals 11 to 18, and 19 represents second transfer gates.

In the imaging device of FIG. 4, upon transfer of signal charges, the clamp gates 19 for determining the clamp potential at the vertical signal lines are operated on DC source. The principle of operation is just the same as that of the imaging device in FIG. 1. The potential $V_{TX2}-V_{thTX2}$ under the clamp gates is determined according to the condition (5), and the second transfer gates determine the clamp level at the vertical lines:

$$V_{TX1} - V_{thTX1} > V_{TX2} - V_{thTX2} \qquad (5)$$

where $V_{TX1}$ represents the high level voltage at the transfer gates 18 (TX1), $V_{TX2}$ the DC voltage applied to the clamp gates 19 (TX2), $V_{thTX1}$ the effective threshold voltage to the transfer gates 18 (TX1) and $V_{thTX2}$ the effective threshold voltage to the clamp gate 19 (TX2).

The fluctuation of the DC voltage applied to the transfer gates 18 (TX1) can be reduced by a low-pass filter provided out of or within the imaging device and as will be understood from condition (5), it is possible to decrease the random noise due to the fluctuation of the gate voltage.

In this embodiment, a diffusion layer may be provided between the transfer gates 18 (TX1) and the clamp gates 19 (TX2). In addition, the gates 18 (TX1) may be operated on DC source and the gates 19 on a pulse. At this time, in place of condition (5), condition (6) is used:

$$V_{TX1} - V_{thTX1} < V_{TX2} - V_{thTX2} \qquad (6)$$

Figure 5:
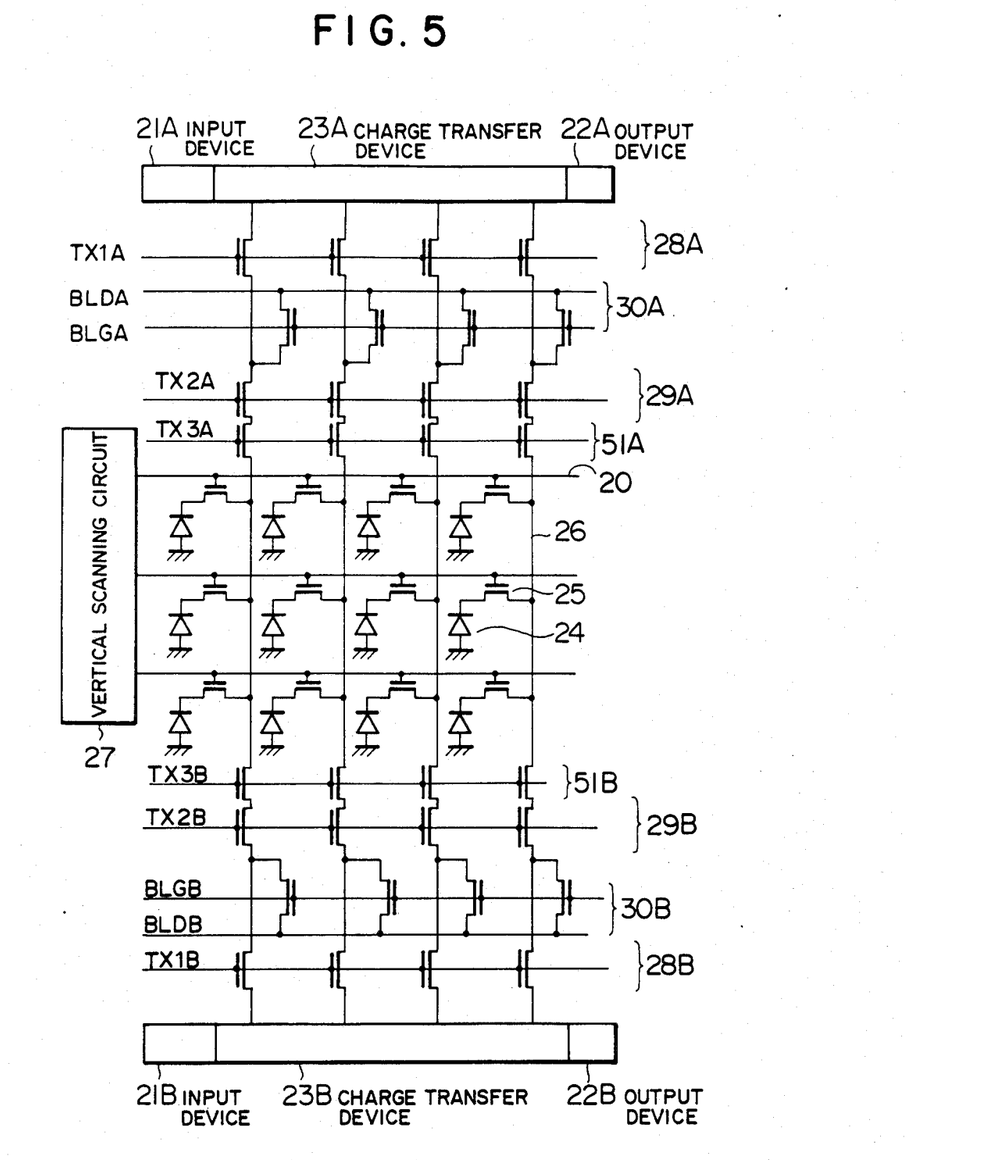

FIG. 5 is a schematic circuit diagram of another imaging device in which DC driven clamp gates are added to the device shown in FIG. 2.

In FIG. 5, like elements corresponding to those of FIG. 2 are identified by the same reference numerals 20 to 30, and 51A and 51B represent clamp gates. The operation principle is the same as that of the device shown in FIG. 2, and this imaging device is different in that the clamp gates 51A and 51B (TX3A, TX3B) for determining the clamp level at the vertical signal lines are driven by DC source (see FIG. 3). Therefore, except for the added TX3B shown by straight line, the same explanation as that with reference to FIG. 2 can be made of the device shown in FIG. 5.

The random noise due to the fluctuation of the gate voltage can be greatly reduced by the addition of the clamp gates 51A and 51B (TX3A, TX3B) just as in the previous embodiment.

Figure 6A:
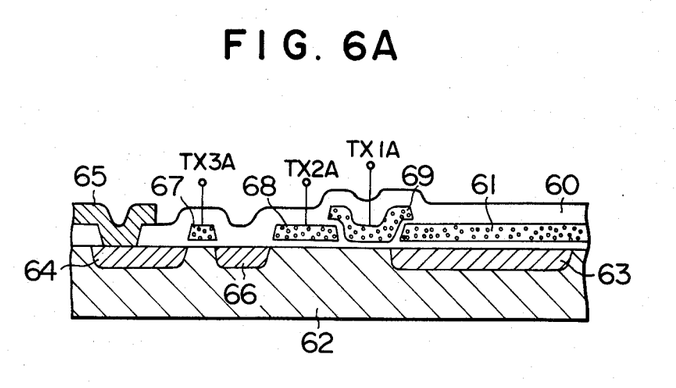
Figure 6B:
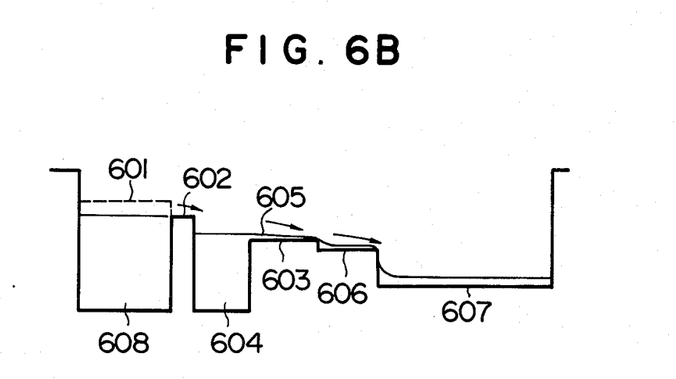

FIG. 6A is a cross-sectional diagram of part of the device including vertical signal lines 26 to CTD 23A of FIG. 5, and FIG. 6B shows potentials along the structure of the part of the device shown in FIG. 6A. The transistors 30A for resetting are omitted in FIGS. 6A, 6B because they are not important here.

Part of a signal charge 601 including the bias charge flows over a potential barrier 602 formed by a gate 67 of the clamp transistor 51A into a n⁻ layer 63 of a CTD 23A through a n+ diffusion layer 66, the underside of a gate 68 of a MOST 29A and the underside of a gate 69 of a horizontal switch MOST 28A. At the end of this operation, it is necessary that no electrons be present under the gate 68, and the potential of the n+ diffusion layer 66 be kept at a potential barrier 603 formed by the gate 68.

However, there is a possibility that since a large amount of electrons 604 as majority carriers are present in the n+ diffusion layer 66, thermally excited electrons may flow over the potential barrier 603 (this causes a parastic effect of tail current in the MOST). This current is exponentially decreased up to 10 times/ 0.1 V) as the potential of the n+ diffusion layer 66 decreases, with the results that the property of the potential barrier 603 lacks shaprness. Particularly, since the MOST 29A is connected to the horizontal switch MOST 28A and resetting MOST 30A, it inevitably has a long gate length and hence low conductance. As a result, the potential of the n+ diffusion layer 66 decreases slowly and thus a considerable amount of charge 605 remains under the gate 68. Such charges 605 are not necessary, unlike the signal charges, and are substantially a kind of error upon reading because they are mixed into signals. A similar phenomenon occurs in the reset operation. When the horizontally arranged MOSTS 29A and 29B have scattered characteristics, such error scatters and thus causes false signals, or fixed noise appearing as vertical stripes on the display screen. This fixed noise level raises the lower limit of the signal to be detected, degrading the sensitivity of the imaging device.

This invention is to further improve the inventions of the prior applications by removing the charge 605 staying under the gate 68 and by lowering the fixed noise so that the sensitivity of the solid-state imaging device can be increased.

The feature of this invention resides in increasing the speed of potential change of the n+ diffusion layer 66 to make it fast reach the stable potential and at the same time flowing out the charges under the gate 68 to lower the fixed noise; that is, MOSTs of small gate length and high conductance are added to take its share of the threshold operation on the diffusion layer 66.

Figure 7:
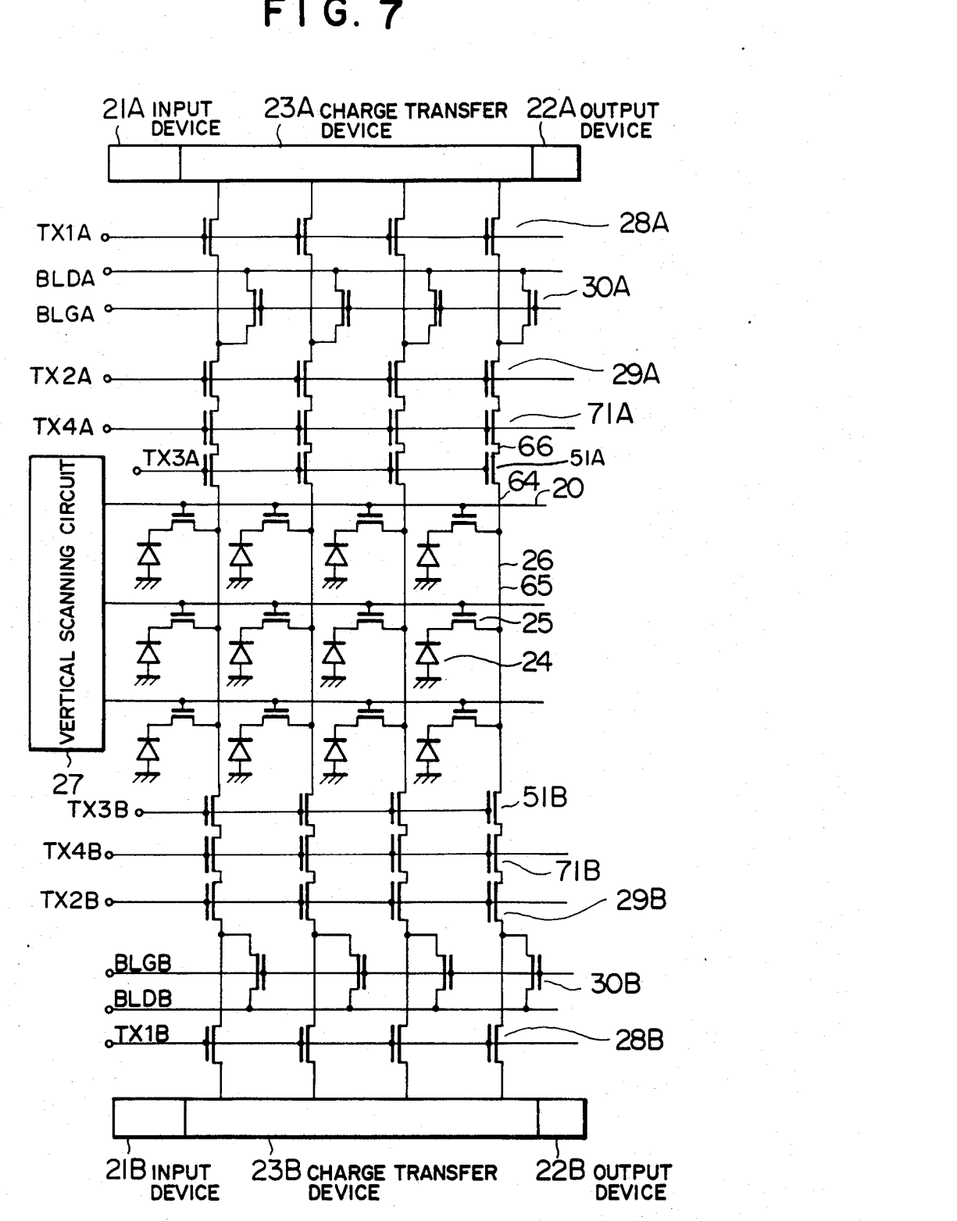
FIGS. 7 and 8A, 8b show an embodiment of this invention.
Figure 8A:
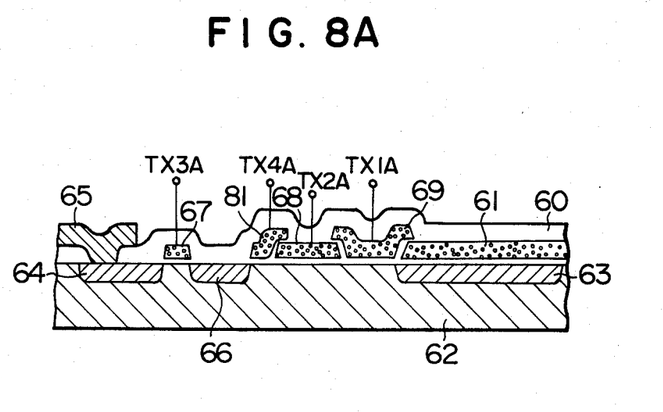
Figure 8B:
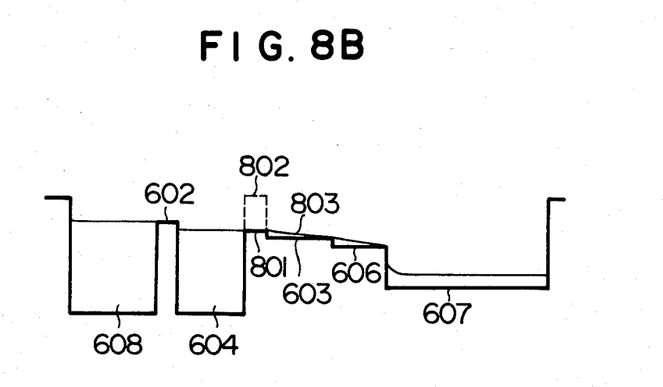

FIG. 7 shows one embodiment of this invention. The third transfer gates, MOSTs 71A and 71B are inserted between the MOST 29A and the clamp MOST 51A and between the MOST 29B and the MOST 51B, respectively. More specifically, as shown in FIG. 8A, a gate 81 of a short gate length of about 4 μm is provided between the n+ diffusion layer 66 and the gate 68, unlike the structure of FIG. 6A. It is important to have no n+ diffusion layer between these two MOSTs. In operation, as shown in FIG. 8B, the threshold operation on the n+ diffusion layer 66 is made by a potential barrier 801 at the gate 81 and the potential 603 at the gate is made sufficiently lower than the potential barrier 801. The barrier 801 makes charges overflow fast because of its short length and thus the potential of the n+ layer rapidly changes so that the flow of electrons into the underside of the gate 68 swiftly decreases.

To make this operation more definite, a negative pulse is applied to the gate 81 after a certain time has elapsed, raising it to a high barrier such as a barrier 802 shown to stop the current completely. Since current no longer flows into the gate, the charge under the gate 68 has flowed out to the n⁻-layer 63 of the CTD 23A. Thus there is no error upon reading. In the resetting operation, the same effect is caused in the CTD 23B, and fixed noise due to this kind of transfer error can be removed irrespective of the scattering of MOSTs 29A and 29B.

As described above, this invention can realize a solid-state imaging device of a high performance as expected by restricting the parasitic effect of a MOST on the charge transfer from the vertical signal line 26 to the CTDs 23A and 23B.

This invention has the same effect for the solid-state image sensing device with a single CTD for the same object.

If the random noise mentioned above is negligibly small, the DC-driven clamp gate 51A (51B) can be omitted.

We claim:

1. A solid-state imaging device comprising:
   a MOS-type photosensor having picture elements each comprising a photodiode and a switching field effect transistor coupled to said photodiode, said picture elements being arrayed in the form of a matrix;
   vertical signal lines coupled to said picture elements for transferring signal outputs of the respective picture elements of said MOS-sensor to a CTD (charge transfer device), wherein the signal outputs of said picture elements are read out by said CTD: and
   signal-transfer means for causing bias charges from said CTD to get into said vertical signal lines so as to mix them with signal charges of said signal outputs of said picture elements and for causing the mixed signal charges to get back into said CTD, said signal-transfer means including a first transfer gate which is connected between the vertical signal line and said CTD, reset means for setting a potential of said signal output line to a predetermined reference voltage before the bias charges get into said signal output line, a second transfer gate which is connected between said first transfer gate element and said vertical signal line, a reset gate element which is connected between a juncture of said first and second transfer gates and reset-voltage line, and a third transfer gate for rapidly removing unnecessary charges from said second transfer gate to lower a fixed noise caused by said unnecessary charges, said third transfer gate being connected between said second transfer gate and said vertical signal line, and
   further comprising a clamp gate for determining the clamp potential at the vertical signal line, which is connected between said third transfer gate and said vertical signal line.

2. A solid-state imaging device comprising:
   a MOS-type photosensor having picture elements each comprising a photodiode and a switching field effect transistor coupled to said photodiode, said picture elements being arrayed in the form of a matrix;
   vertical signal lines coupled to said picture elements for transferring signal outputs of the respective picture elements of said MOS-sensor to a CTD (charge transfer device), wherein the signal outputs of said picture elements are read out by said CTD; and
   signal-transfer means for causing bias charges from said CTD to get into said vertical signal lines so as to mix them with signal charges of said signal outputs of said picture elements and for causing the mixed signal charges to get back into said CTD, said signal-transfer means including a first transfer gate which is connected between the vertical signal line and said CTD, reset means for setting a potential of said signal output line to a predetermined reference voltage before the bias charges get into said signal output line, a second transfer gate which is connected between said first transfer gate element and said vertical signal line, a reset gate element which is connected between a juncture of said first and second transfer gates and a reset-voltage line, and a third transfer gate for rapidly removing unnecessary charges from said second transfer gate to lower a fixed noise caused by said unnecessary charges, said third transfer gate being connected between said second transfer gate and said vertical signal line, wherein at least two CTDs are coupled to said each vertical signal line to construct first and second read-out channels by means of the first and second CTDs, and means for transferring the signal outputs to the first channel in a first half of a horizontal blanking period and for transferring the signal outputs to the second channel in a latter half of the horizontal blanking period, and further comprising clamp gates for determining the clamp potential at the vertical signal lines, said clamp gates being connected between said third transfer gate and said vertical signal line, respectively.

* * * * *